(12) United States Patent
Newell

(10) Patent No.: US 8,381,260 B2
(45) Date of Patent: Feb. 19, 2013

(54) SEPARATE ADDRESSING OF A MEDIA CONTENT RECEIVER AND AN INSTALLED REMOVABLE CIRCUIT DEVICE

(75) Inventor: Nicholas Brandon Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 450 days.

(21) Appl. No.: 12/499,580

(22) Filed: Jul. 8, 2009

(65) Prior Publication Data

US 2011/0010734 A1 Jan. 13, 2011

(51) Int. Cl.
*H04N 7/16* (2011.01)
*H04N 7/173* (2011.01)
*H04N 7/20* (2006.01)

(52) U.S. Cl. ........... 725/152; 725/140; 725/132; 725/68

(58) Field of Classification Search .................. 725/132, 725/140, 152
See application file for complete search history.

(56) References Cited

U.S. PATENT DOCUMENTS

| | | | | |
|---|---|---|---|---|
| 5,715,515 | A * | 2/1998 | Akins et al. | 725/142 |
| 6,157,719 | A * | 12/2000 | Wasilewski et al. | 380/210 |
| 7,069,439 | B1 * | 6/2006 | Chen et al. | 713/172 |
| 2002/0120928 | A1 * | 8/2002 | Wajs | 725/25 |
| 2007/0180464 | A1 * | 8/2007 | Dellow et al. | 725/31 |
| 2009/0049507 | A1 * | 2/2009 | Yasuho et al. | 725/152 |
| 2009/0125966 | A1 * | 5/2009 | Cho et al. | 725/131 |
| 2009/0193151 | A1 * | 7/2009 | Adams et al. | 710/5 |

* cited by examiner

*Primary Examiner* — Chris Parry
(74) *Attorney, Agent, or Firm* — Ingrassia Fisher & Lorenz, P.C.

(57) ABSTRACT

A media content receiver receives a message including an address. The receiver processes the address to determine whether the address is associated with the media content receiver. Additionally, if a removable circuit device is installed in the receiver, the receiver processes the address to determine whether the address is associated with the installed removable circuit device. If the address is associated with the media content receiver, the receiver processes the message. If the address is associated with the removable circuit device, the receiver transfers the message to the removable circuit device, which then processes the message.

16 Claims, 7 Drawing Sheets

SEPARATE ADDRESSING OF A MEDIA CONTENT RECEIVER AND AN INSTALLED REMOVABLE CIRCUIT DEVICE

BACKGROUND

Media content receivers, such as satellite and cable television broadcast receivers or set-top boxes (STBs), may facilitate access to literally hundreds of television programming channels provided for subscribers of a television broadcasting service. In the case of satellite television receivers, one or more satellite uplink facilities receive programming from several different content sources, such as major broadcast networks, independent television stations, and the like. The uplink facility then transmits this programming over wireless uplink communication paths to a satellite, which then broadcasts the programming over a set of wireless downlinks to the receivers.

In the case of satellite television broadcast systems, the uplink center often encrypts multiple channels of the transmitted programming to prevent reception of those channels by receivers that are not authorized to access that programming. For example, some of the channels may be available to all subscribers of a particular programming service, while other channels may be premium channels requiring an additional payment from the subscriber for access thereto. As a result, a receiver authorized to receive and display certain channels for a subscriber must be configured with one or more programming decryption keys to decrypt those channels the set-top box is authorized to receive. To this end, a removable circuit device (sometimes referred to as a "smart card") that contains the necessary programming decryption keys, algorithms, or circuitry, as well as other information related to a particular programming service subscriber, may be installed in each of the receivers to facilitate access to the programming authorized for a particular user subscription.

Over time, television service "pirates" attempting to gain unauthorized access to the programming may discover the necessary decryption keys and algorithms to decrypt the programming. In an effort to counter this piracy, the programming service provider may periodically change the decryption keys by way of communications directed to each of the installed removable circuit devices over the same communication path carrying the programming to the satellite television receivers. Since each receiver may be authorized to access a different set of programming channels, at least some programming decryption keys may be directed to specific receivers. To that end, each of the removable circuit devices is associated with a unique address so that messages containing the programming decryption keys may be sent to targeted smart cards by way of their address. Each receiver is thus configured to receive and process only those messages that are addressed to its installed removable circuit device. Further, the uplink facility often exploits this addressing capability of the removable circuit device to transmit other information, such as user text messages and control commands, to both the removable circuit device and the associated receiver.

To further thwart the efforts of programming pirates, the programming service may periodically replace currently-installed removable circuit devices, or smart cards, with newer, more sophisticated devices, thus making piracy more difficult. Ordinarily, the programming service sends the newer cards to the subscribers and instructs the subscriber to replace the older removable circuit devices with the newer cards so that the subscriber may continue to enjoy the programming to which the subscriber is entitled.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
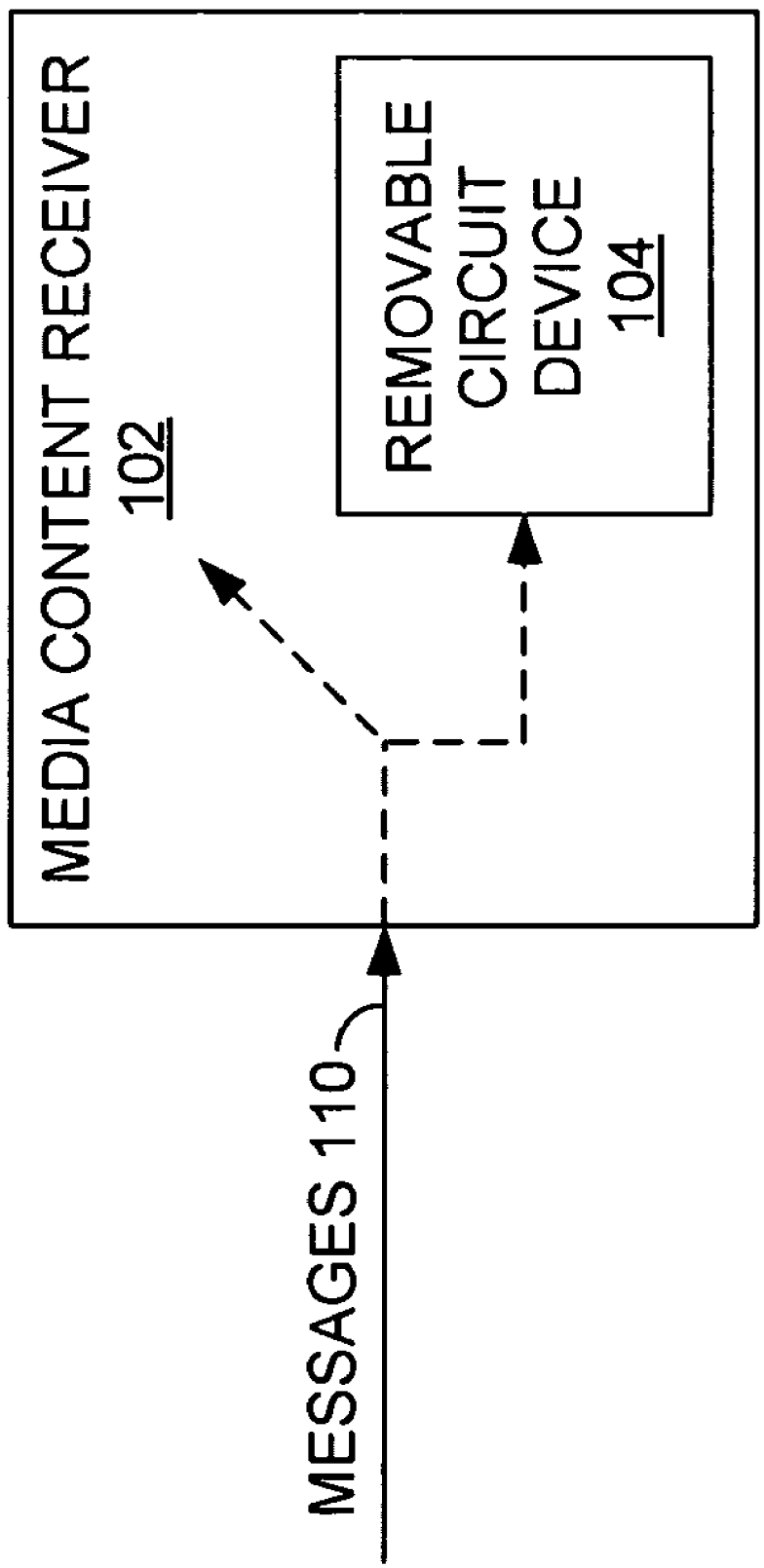
FIG. 1 is a simplified block diagram of a media content receiver and a removable circuit device installed therein according to an embodiment of the invention.

FIG. 1 is a simplified block diagram of a media content receiver 102 with a removable circuit device 104 installed in the receiver 102. In one embodiment, the media content receiver 102 may be, but is not limited to, a satellite television set-top box, a cable television set-top box, a terrestrial ("over-the-air") television set-top box, and a satellite radio receiver. Generally, the media content receiver 102 is responsible for receiving media content, such as audio and/or video programming, including movies, news programs, weekly episodes, sporting events, and so on, and for transferring that content for presentation to a user. One example of the removable circuit device 104 is a "smart card" or similar unit employed to store security and related information allowing the media content receiver 102 to receive specific media content to which a user of the receiver 102 has subscribed. As the name implies, the removable circuit device 104 is configured to be removed from the receiver 102, and possibly replaced with another removable circuit device 104 to provide different or enhanced security and other features relating to access of the media content.

Figure 2:
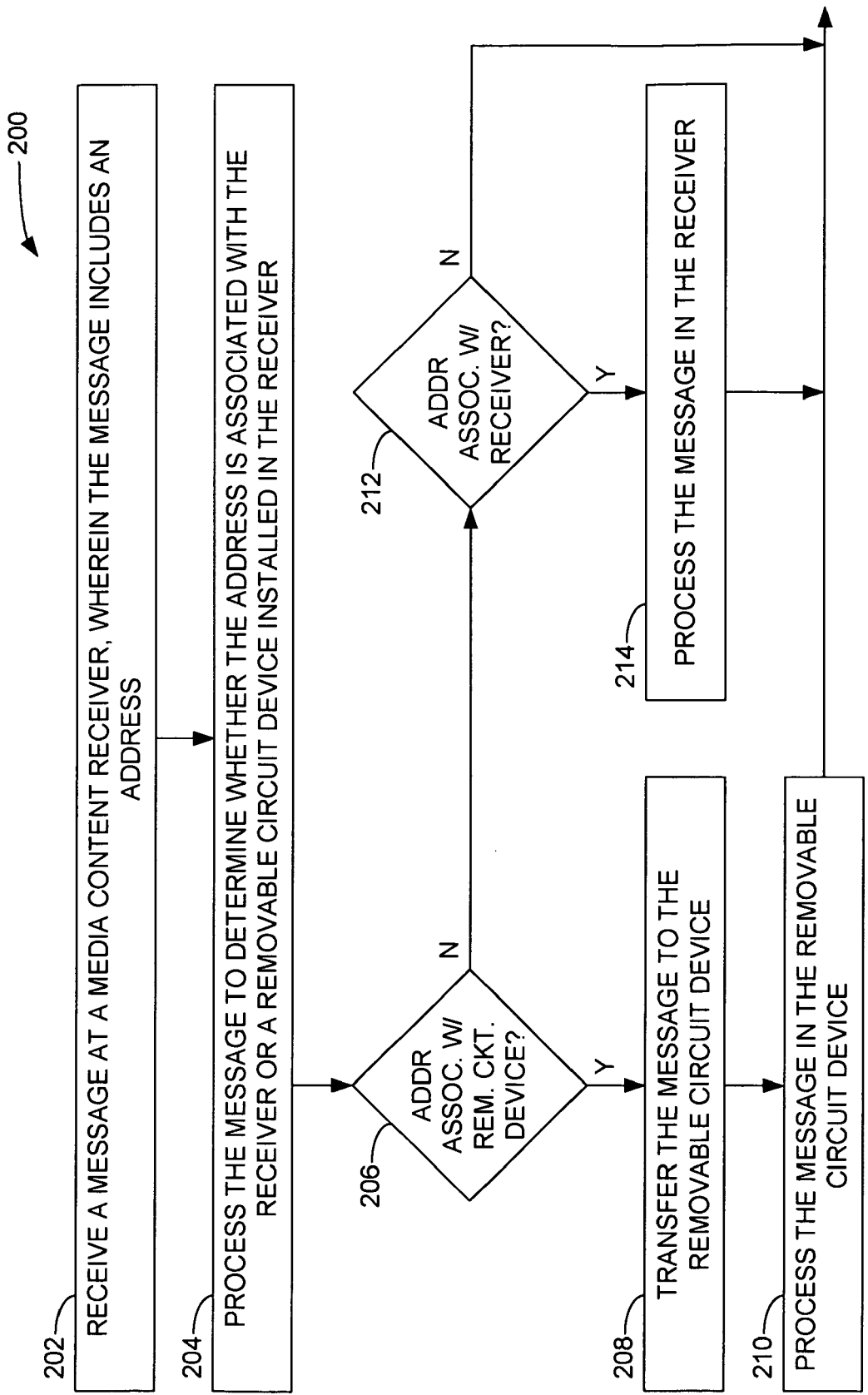
FIG. 2 is a flow diagram of a method of communication involving the media content receiver and the removable circuit device of FIG. 1 according to an embodiment of the invention.

FIG. 2 presents a flow diagram of a method 200 of communication involving the media content receiver 102 and the installed removable circuit device 104 of FIG. 1. In this method 200, each of the receiver 102 and the removable circuit device 104 are separately addressable, although the removable circuit device 104 receives its messages by way of the receiver 102.

In the method 200, the media content receiver 102 receives a message 110 including an address (operation 202). The receiver 102 processes the message 110 to determine whether the address is associated with the receiver 102 or the removable circuit device 104 (operation 204). If the address is associated with the removable circuit device 104 (operation 206), the receiver 102 transfers the message 110 to the removable circuit device 104 (operation 208). The removable circuit device 104 then processes the message 110 (operation 210). If the address is associated with the receiver 102 (operation 212), the receiver 102 processes the message 110 (operation 214). In another example, if the removable circuit device 104 is not installed in the receiver 102, the receiver 102 may only need to determine whether the address is associated with the receiver 102.

While the operations of FIG. 2 are depicted as being executed in a particular order, other orders of execution, including concurrent execution of two or more operations, may be possible. In another embodiment, a computer-readable storage medium may have encoded thereon instructions for a processor or other control circuitry of the media content receiver 102 of FIG. 1 to implement the method 200.

As a result of at least some of the embodiments of the method 200, communication with the media content receiver 102 is possible in the absence of the removable circuit device 104, which is beneficial when either the address or the mere presence of the removable circuit device 104 is in doubt. For example, when the user or subscriber is shipped a replacement removable circuit device 104 due to changes in the programming decryption key, enhancements in the decryption algorithm, or the like, various circumstances may result in the replacement device 104 not being installed. For example, the newer device 104 may not reach the subscriber due to a delivery error, or the subscriber may have misplaced the device, or merely have neglected to install it. Further, multiple such devices 104, each with a different communication address, may have been mailed to the subscriber in an effort to remedy the situation. As a result, even if one of the newer removable circuit devices 104 has been installed, exactly which of the devices 104 is installed may remain unknown, thus making use of the proper address for communication with the installed device 104 problematic. Thus, associating an address with the receiver 102 allows some communications with the receiver 102 regardless of whether a removable circuit device 104 is installed therein. Other advantages may be recognized from the various implementations of the invention discussed in greater detail below.

Figure 3:
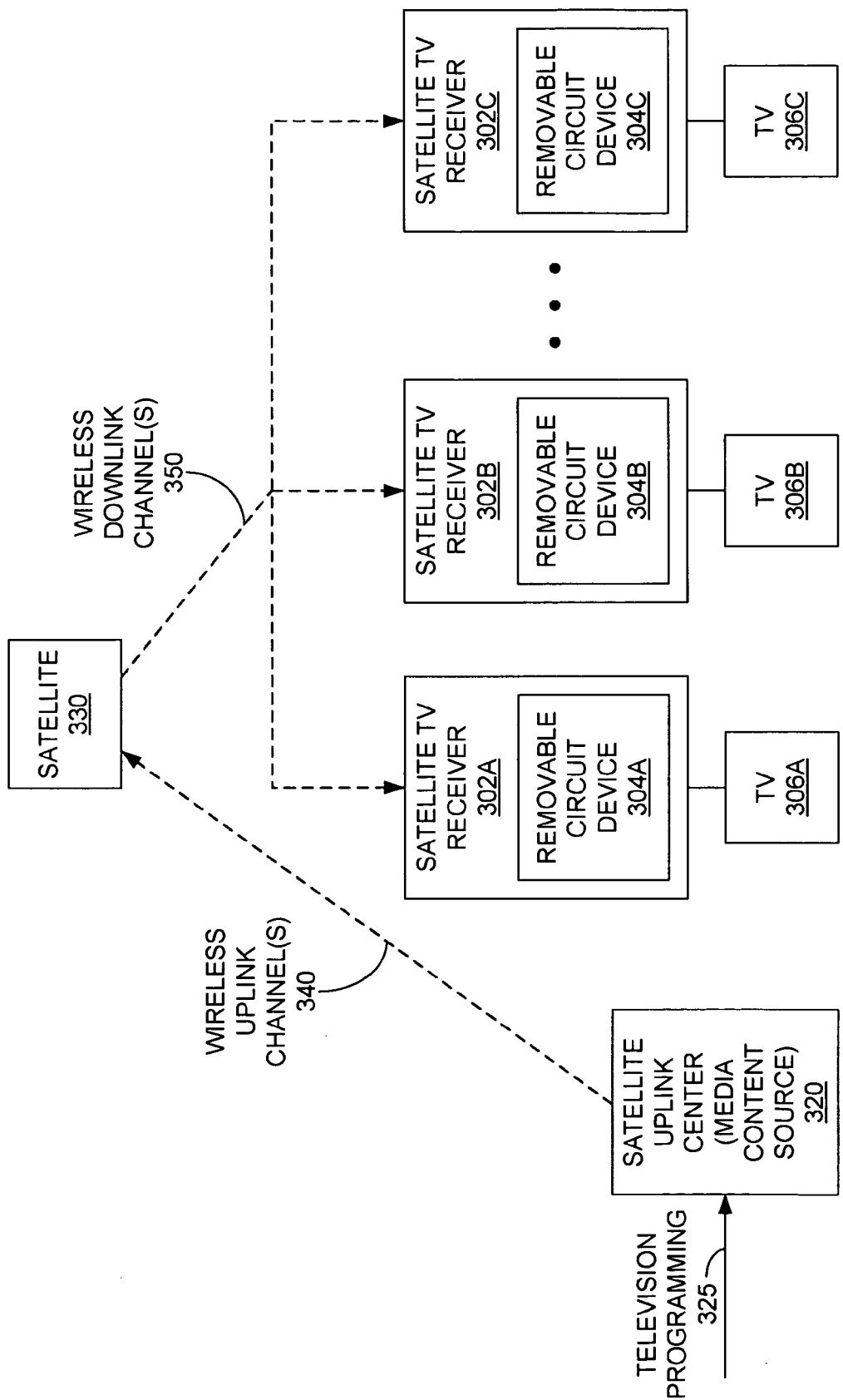
FIG. 3 is a block diagram of a satellite broadcast television system according to an embodiment of the invention.

FIG. 3 is a block diagram of a satellite television broadcast system 300 according to an embodiment of the invention. The system 300 includes a satellite uplink center 320, one or more satellites 330, and multiple satellite television receivers or set-top boxes 302. While the embodiments discussed below involve the satellite television system of FIG. 3, other types of media content communication systems, such as cable and terrestrial satellite television systems, satellite radio systems, and the like, may benefit from application of the various concepts discussed below.

The satellite uplink center 320 serves a media content source for the delivery of satellite television programming, such as movies, news programs, sporting events, and myriad other television programs, to multiple satellite television receivers 302. More specifically, the uplink center 320 receives television programming 325, typically from multiple content providers, such as major broadcast networks, cable television networks, and so on. This programming 325 may be received by way of terrestrial cable, satellite, or other means. In another example, the programming 325 may be stored in the satellite uplink center 320 for subsequent transmission to the satellite 330. The uplink center 320 may then process the incoming programming 325, and then encode, encrypt, modulate, and retransmit the programming 325 over one or more wireless uplink channels 340 to one or more satellites 330. The satellites 330 may then retransmit the programming by way of one or more transponders incorporated in the satellites 330 over one or more wireless downlink channels 350 to the satellite television receivers 302 below. Each of the receivers 302 receive and process the programming transferred over the wireless downlink channels 350 for presentation to viewers by way of one or more televisions or similar output devices 306.

In addition to the programming, the satellite uplink center 320 also communicates with the receivers 302 and installed removable circuit devices 304 by way of messages transmitted via the uplink channels 340, satellites 330, and downlink channels 350 to the various receivers 302 and removable circuit devices 304 for the purpose of transmitting control and status information. For example, changes in subscription information, such as the selection of additional premium channels by a particular user, may result in the transmission of messages containing the necessary programming decryption keys for those channels by way of the same path employed by the programming to the intended receiver 302 and associated removable circuit device 304.

In one implementation, each of the removable circuit devices 304, sometimes called "smart cards", includes circuitry which provides unique security information related to a user service subscription associated with the receiver 302 in which the smart card 304 is installed. For example, the smart card 304 may include information concerning which premium channels, possibly requiring an additional subscription fee, are accessible through the subscription, as well as the decryption keys required to decrypt the premium channels. Other information related to merchandise purchased by way of the receiver 302, as well as any other information specifically identified with the subscription associated with the smart card 304, may be stored or otherwise reflected in the smart card 304. In one embodiment, the smart card or removable circuit card 304 may include circuitry such as a processor, memory, and other digital logic capable of providing the above functionality.

Figure 4:
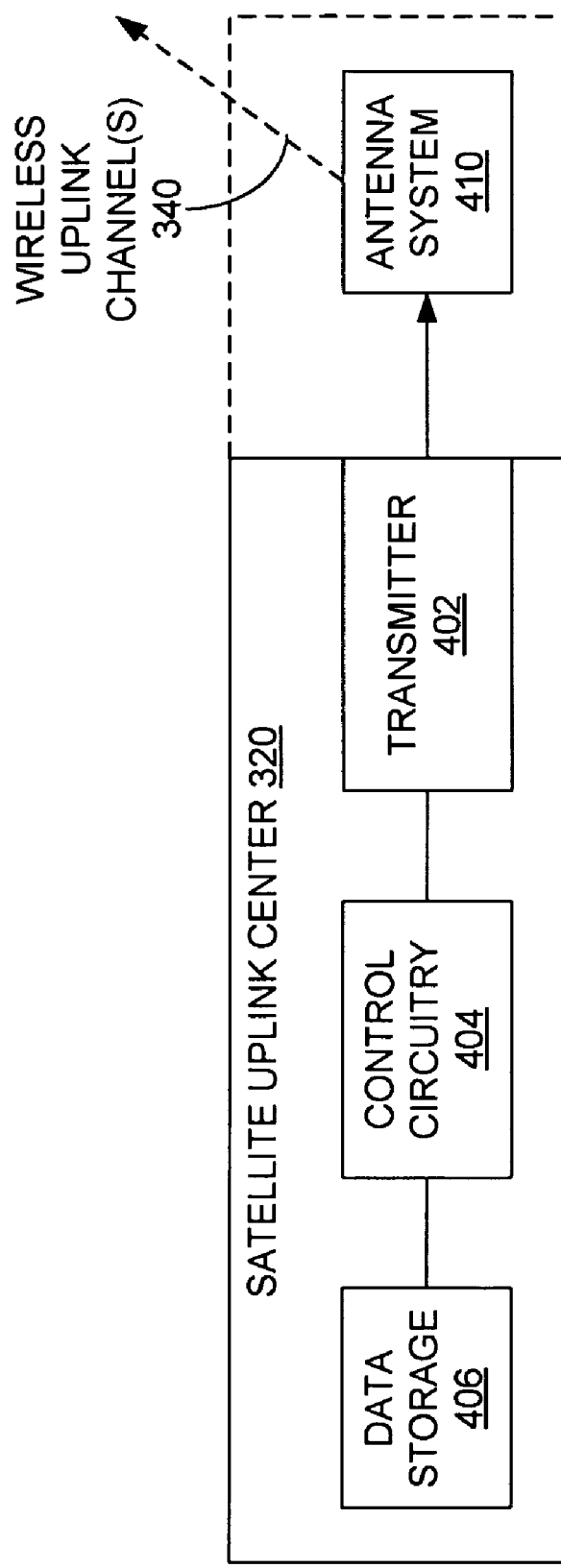
FIG. 4 is a block diagram of a satellite uplink center of the broadcast television system of FIG. 3 according to an embodiment of the invention.

A simplified depiction of the satellite uplink center 320 is presented in FIG. 4. The satellite uplink center 320 includes a transmitter 402, control circuitry 404, and data storage 406. Also included may be an antenna system 410, which may be considered an integrated part of the satellite uplink center 320, or a separate system 410 coupled with the uplink center 320. The satellite uplink center 320 may also include other components or systems, such as a user interface, but such circuitry is not explicitly illustrated in FIG. 5 to simplify the following the discussion.

The transmitter 402 is configured to transmit the programming and messages by way of the wireless uplink channels 340 to the satellite 330. The transmitter 402 may also be configured to perform and process of the programming, such as encoding the programming into some transmission format, such as one of the Motion Picture Experts Group (MPEG) formats, including MPEG-2 and MPEG-4. The programming may also be encrypted to prevent unauthorized access to the programming. Further, the programming is transmitted to the satellites 330 by way of the antenna system 410. In one implementation, the antenna system 410 may include one or more large parabolic or hyperbolic antennas capable of transmitting radio-frequency signals.

The control circuitry 404 is configured to control the transmitter 402 for the transfer of the programming by way of the antenna system 410. The control circuitry 404 may include one or more processors, such as a microprocessor, microcontroller, or digital signal processor (DSP), configured to execute instructions directing the processor to perform the functions discussed more fully below. The control circuitry 404 may also include memory or data storage adapted to contain such instructions. Alternatively, the data storage 406 may be employed to store such instructions. In another implementation, the control circuitry 404 may be strictly hardware-based logic, or may include a combination of hardware, firmware, and/or software elements.

In addition to facilitating the transmission of programming, the control circuitry 404 generates and transmits the messages described above for communicating with the receivers 302 and installed removable circuit devices 304. In one implementation, each of the messages includes an address indicating which receiver 302 or removable circuit device 304 is the destination for a particular message. Each of the receivers 302 and circuit devices 304 is associated with a unique address so that the uplink center 320 may direct a message to a single receiver 302 or removable circuit device 304. In one example, each of the addresses may be associated with a particular identifier related to a specific subscription or account. Such an identifier may be a subscription or account number in one embodiment, although other types of identifiers may be employed in other contexts.

The data storage 406 of the satellite uplink center 320 is configured to store the addresses of the receivers 302 and the installed circuit devices 304. The data storage 406 may be any digital data storage medium, such as solid state memory (including static random accesses memory (SRAM), dynamic random access memory (DRAM), and flash memory), direct access memory (such as one or more hard disk drives or optical disk drives), or any other volatile or non-volatile memory system.

Figure 5:
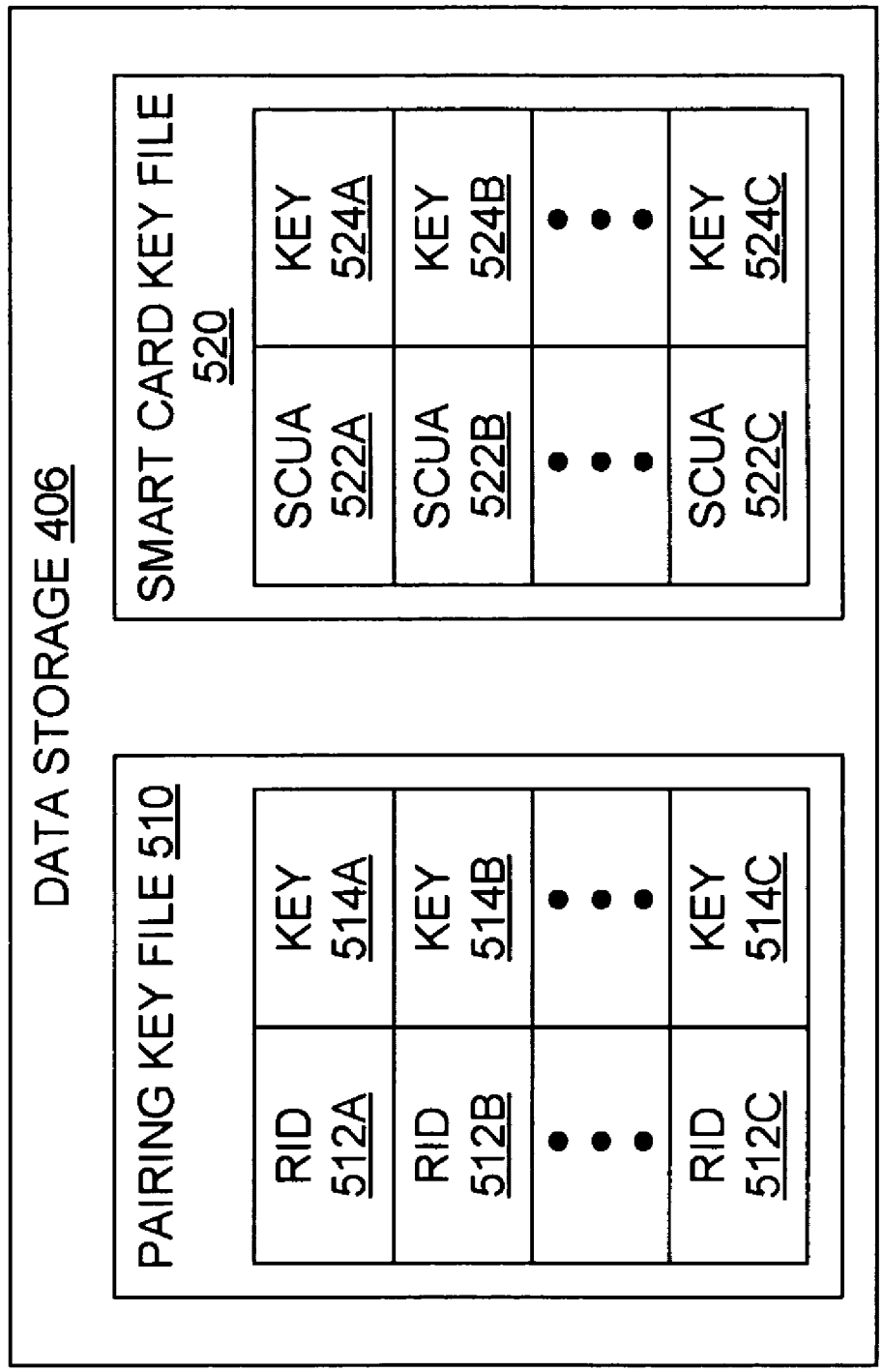
FIG. 5 is a block diagram of a data storage system of the uplink center of FIG. 4 according to an embodiment of the invention.

FIG. 5 provides a graphical representation of the data storage 406 and its contents according to one embodiment. In this example, each of the addresses associated with a receiver 302 is termed a receiver identifier (RID) 512, while each address identified with a removable circuit device 304 is called a smart card unique address (SCUA) 522. Either or both of the receiver IDs 512 and the smart card unique addresses 522 may be "hardwired", or permanently programmed, into the appropriate receiver 302 or smart card 304 prior to the unit being delivered to the subscriber. In other examples, the addresses 512, 522 may be reprogrammed only by the provider of the receivers 302 and the removable circuit devices 304.

In another embodiment, other addresses may be associated with either or both of the receiver 302 and the removable circuit device 304 to allow simultaneous addressing of multiple receivers 302 or smart cards 304. For example, a "shared address" may be associated with each of a group of smart cards 304, such as all smart cards 304 located within a particular geographical area, or all smart cards 304 possessed by a particular subscriber or entity. Therefore, a single message may be transmitted to, and received by, all of the smart cards 304 associated with that shared address. One example of such a message may be a warning to be displayed to the user concerning a local weather or law enforcement emergency. In another example, every receiver 302 and/or installed removable circuit device 304 may be associated with a "global address" so that a single broadcast message may be transmitted to all receivers 302 and/or removable circuit devices 304.

Further, each of the addresses 512, 522 may be associated with a specific encryption key utilized by the control circuitry 404 to encrypt the messages before transmission to provide security against unauthorized access to the messages by third parties. In the specific arrangement shown in FIG. 5, each of the register IDs 512 is associated with a specific encryption key 514 within a pairing key file 510. Similarly, each of the smart card unique addresses 522 is paired with a particular encryption key 524 in a smart card key file 520. However, other memory arrangements, such as combining the pairing key file 510 and the smart card key file 520 into a single file, may be utilized in other embodiments. In other implementations, one or both of the encryption keys 514, 524 may be used within the receiver 302 and/or the removable circuit device 304 to encrypt and decrypt communications therebetween.

Figure 6:
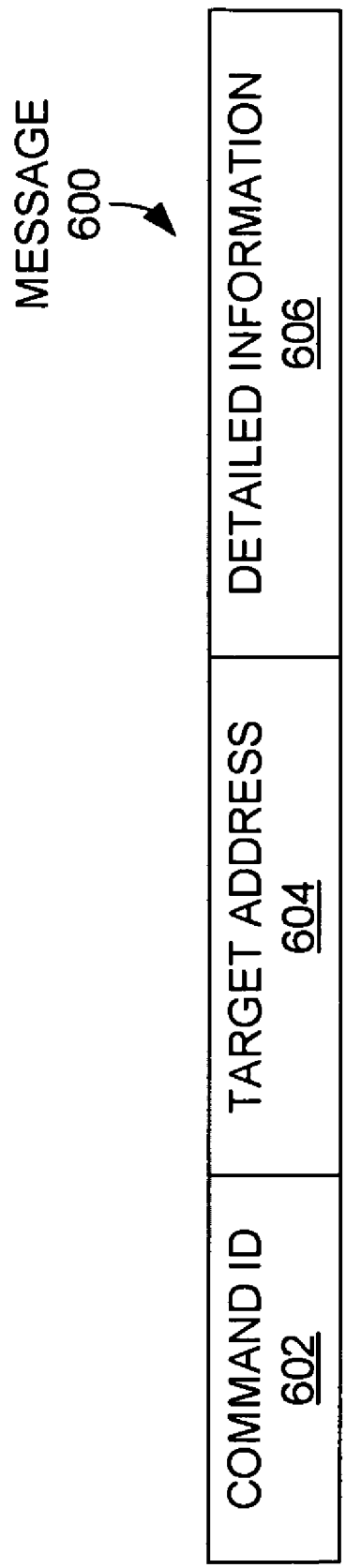
FIG. 6 is a graphical representation of the format of messages transmitted from the uplink center by way of a satellite to multiple satellite television receivers as shown in the system of FIG. 3 according to an embodiment of the invention.

FIG. 6 provides a graphical representation of one possible format for a message 600 being generated and transmitted by the uplink facility to one of the receivers 302 or installed removable circuit devices 304. Included in the message 600 are a command identifier 602, a target address 604, and detailed information 606 relating to the command identifier 602. The target address 604 may be one of the receiver identifiers 512 or the smart card unique addresses 522. In one example, the target address 604 is a ten-digit number, wherein each digit comprises multiple bits, although any type of alphanumeric indicator may be used for the address 604. Other types of addresses, such as the shared addresses and global addresses mentioned above, may also serve as the target address 604 in some implementations. In one example, the target address 604 may also include an indicator or flag denoting whether the address represents a receiver identifier 512 or a smart card unique address 522 to simplify the processing of the address in the receiver 302, which is described in greater detail below.

The command identifier 602 identifies a particular command or status function that the target receiver 302 or smart card 304 is to process. In addition to the command identifier 602, the message 600 may include detailed information 606 related to the command identifier 602. For example, the command identifier 302 may require that the current decryption key for a particular premium channel that is stored in the smart card 304 be replaced or updated. The detailed information 606 may include the new replacement decryption key, along with an indication of which premium channel is affected. As such, the target address 604 for such a command may be the unique address 522 of removable circuit device 304, given the involvement of the command with the device 304.

In another example, the command identifier 602 of the message 600 may instruct the receiver 302 or the installed removable circuit device 304 to update an electronic program guide (EPG) stored in the receiver 602 to display the schedule of programs to be broadcast for a particular period of time. In that case, the detailed information 606 may include the EPG data to be added to the EPG currently stored in the receiver

302. As a result, the target address 604 for this type of command may be the receiver ID 512 of the associated target receiver 302, although the unique address 522 of the smart card 304 installed in the receiver 302 may also serve as the target address 604 in some implementations.

A command identifier 602 for another message 600 may indicate a command to update the firmware employed in the receiver 302. In this situation, the detailed information 606 of the message 600 may include at least a portion of the newer firmware for replacing the firmware currently stored in the receiver 302. Again, as this type of information may more directly involve the target receiver 302, the receiver ID 512 associated with that receiver 302 may be employed as the target address 604 of the message. However, in other implementations, the target address 604 may be the unique address 522 of the installed removable circuit device 304.

Another message 600 may include a text instruction to be passed on to the user of a specific receiver 302 to replace the current smart card 304 with a replacement smart card 304 that will be, or has already been, delivered to the user. This instruction would likely be displayed by way of the one or more televisions 306 coupled with the receiver 302 intended to receive the message 600. The instruction may further indicate that failure to replace the smart card 304 may result in loss of access to the programming to which the user has subscribed, as all programming will ultimately be encrypted using a new encryption key or algorithm. In this particular case, the detailed information 606 associated with this command identifier 602 may pertain to the content of the instruction, as well as the presentation of the instruction, such as when the instruction is shown during the day, how often the instruction is shown, the maximum number of times the instruction is to be displayed, and when display of the instruction should be terminated.

Due to the potential problems associated with timely delivery and installation of the newer removable circuit device 304 described above, the target address 604 of the message 600 is the receiver identifier 512 of the receiver 302 containing the smart card 304 to be replaced. As a result, regardless of whether the newer smart card 304, the older smart card 304, or neither is currently installed in the receiver 302, the instruction may still be presented to the user due to the receiver 302 receiving the message 600.

In one embodiment, the detailed information 606 associated with the instruction may indicate the unique address 522 or some other identifier indicated on the surface of the specific smart card 304 to be installed. The receiver 302 may display such information to the user by way of the connected television 306 so that the user knows which one of multiple smart cards 304 that may have been delivered to the user should be installed in the receiver 302. Such information may further prevent any temporary loss of access to the programming to which the user has subscribed.

In some implementations, the control circuitry 404 of the satellite uplink center 320 encrypts at least portions of each message 600 according to the information stored in the data storage 406 illustrated in FIG. 5. More specifically, the command identifier 602 and the detailed information 606 may be encrypted to prevent unauthorized access to potentially sensitive information, such as new decryption keys, subscription information, and the like, that the television service provider desires to keep secure. In this scenario, the target address 604 may remain unencrypted so that the receiver 302 or installed removable circuit device 304 that is intended as the target of the message 600 can quickly determine whether the target should attempt to decrypt and process the message 600. In other embodiments, different portions of the message 600 may be encrypted, including all or none of the message 600.

Figure 7:
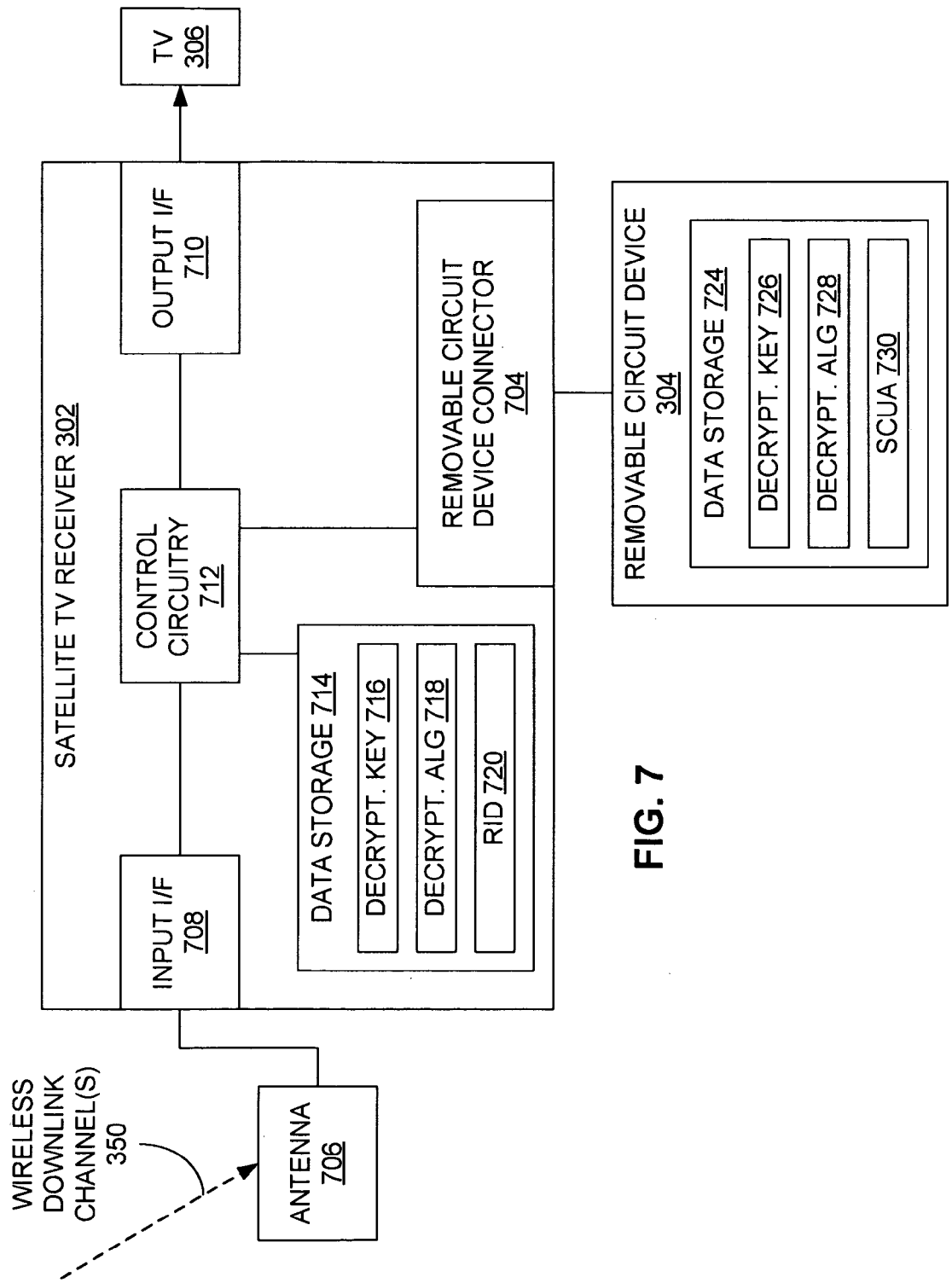
FIG. 7 is a block diagram of a satellite television receiver shown in the system of FIG. 3 according to an embodiment of the invention.

FIG. 7 is a block diagram of the satellite television receiver 302 of FIG. 3 according to one embodiment. As shown, the receiver 302 includes a connector 704 for a removable circuit device 304, an input interface 708, an output interface 710, control circuitry 712, and data storage 714. Other components, such as a user interface, including a remote control interface, which may be included in the receiver 302 are not explicitly illustrated in FIG. 7 to focus and facilitate the following discussion.

The connector 704 is configured to receive and retain a removable circuit device or smart card 304, as discussed above. In one implementation, the connector 704 is accessible from the exterior of the receiver 302 so that a user or subscriber may easily install and uninstall the removable circuit device 304. The connector 304 may be configured according to one of the Personal Computer Memory Card International Association (PCMCIA) physical formats, although other types of connector formats and connection schemes may be utilized in other arrangements.

The input interface 708 is configured to receive both the programming and the messages 600 discussed above by way of the wireless downlink channels 350 depicted in FIG. 3. In the specific example of FIG. 7, the programming and messages 600 are received by way of an external antenna 706 connected to the input interface 706. In one embodiment, the antenna 706 is a hyperboloid dish-type antenna with a low-noise block-converter/feedhorn (LNBF) combination to capture and amplify the signals of the downlink channels 350 and down-convert their frequencies into an intermediate frequency (IF) range for processing by the input interface 708. However, antenna arrangements other than the one specifically noted above may be employed in other implementations.

The input interface 708 of FIG. 7 may also include at least one content channel selection resource, such as a tuner or similar circuitry for selecting one or more audio/video programming channels being transmitted over the wireless downlink channels 350 from the satellite 330, descrambler circuitry for descrambling the programming, and other circuitry. Also, the audio/video programming may be a program from a broadcast channel or network, a video-on-demand (VOD) program, a pay-per-view (PPV) event, or another type of program. The input interface 708 also receives the messages 600 from the uplink center 320 as described above.

The output interface 710 of the receiver 302 is configured to deliver the selected television programming to the television 306 or similar output device in a format usable by that device 306. For example, the video portion of the selected programming may be delivered by way of a modulated video cable connection, a composite or component video RCA-style (Radio Corporation of America) connection, and a Digital Video Interface (DVI) or High-Definition Multimedia Interface (HDMI) connection. The audio portion may be transported over a monaural or stereo audio RCA-style connection, or over an HDMI connection. Other audio/video formats and related connections may be employed in other embodiments.

The control circuitry 712 is configured to communicate with and control the input interface 708, the output interface 710, an installed removable circuit device 304 by way of the connector 704, and the data storage 714 to perform the various functions described hereinafter. The control circuitry 712 may include one or more processors, such as a microprocessor, microcontroller, or DSP, configured to execute instructions directing the processor to perform such functions. The control circuitry 712 may also include memory or data storage adapted to contain such instructions. Alternatively, the data storage 714 may be employed to store such instructions. In another implementation, the control circuitry 712 may be strictly hardware-based logic, or may include a combination of hardware, firmware, and/or software elements.

In one embodiment, the data storage 714 of the receiver 302 is configured to store a receiver decryption key 716 that the control circuitry 712 may employ to decrypt encrypted portions of messages 600 addressed to the receiver 302. In addition, the data storage 714 may also include a receiver decryption algorithm 718 that utilizes the decryption key 716 to perform the message 600 decryption. The data storage 714 may also store the receiver identifier 720 employed as the address of the receiver 302 for the reception of messages 600. Overall, the data storage 714 may be any digital data storage medium, such as static random accesses memory (SRAM), dynamic random access memory (DRAM), flash memory, one or more hard or optical disk drives, or any other volatile or non-volatile memory system.

Similarly, an installed removable circuit device or smart card 304 may also include data storage 724, which may be solid state memory, such as flash memory, or some other memory device or component. This data storage 724 may store a smart card decryption key 726 for decrypting at least one or more portions of messages 600 addressed to the smart card 724, as well as a related smart card decryption algorithm 728 which utilizes the smart card key 724 to decrypt the messages 600. In one implementation, the smart card decryption algorithm 728 may be embodied as a logic circuit that implements the algorithm 728 on encrypted data that is provided as input to the logic circuit. Also included in the data storage 724 may be the smart card unique address 730 associated with the removable circuit device 304.

In operation, the input interface 708 receives television programming from the satellite 330 over one or more wireless downlink channels 350 and transfers the programming to the television 306 or other output device by way of the output interface 710 under the direction of the control circuitry 712. The input interface 708 also receives the messages 600 from the satellite 330 by way of the wireless downlink channels 350. The control circuitry 712 then analyzes the target address 604 of each of the messages 600 to determine if the current message 600 is directed to either the receiver 302 or the installed smart card 304. To that end, the control circuitry 712 may compare both the receiver identifier 720 and the smart card unique address 730 from the receiver data storage 714 and the smart card data storage 724, respectively, to the incoming messages 600 captured by way of the input interface 708. In this implementation, the target address 604 of each message 600 is not encrypted so that the control circuitry 712 may perform the comparison without any type of decryption of the target address 604 being performed beforehand.

In addition, one or both of the receiver 302 and the removable circuit device 304 may be associated with one or more additional addresses, such as a shared address or global address, as discussed earlier. As a result, the control circuitry 712 may also compare the incoming messages 600 against these addresses as well. As with the receiver identifier 720 and the smart card unique address 730, these additional addresses may be stored in the particular data storage 714, 724 of the associated receiver 302 or smart card 304.

By comparing the addresses of the receiver 302 and the smart card 304 against the target address 604 of the incoming messages 600, the control circuitry 712 acts as a message "filter", accepting only those messages 600 directed to the receiver 302 or the removable circuit device 304, and ignoring or rejecting others. For those messages 600 so addressed, the control circuitry 712 transfers those messages 600 addressed to the removable circuit device 304 to that device 304 for processing. In response, the removable circuit device 304 may then decrypt any encrypted portions of the message 600, such as the command identifier 602 and the detailed information 606, using the smart card decryption key 726 and associated decryption algorithm 728 mentioned above.

After such decryption, if necessary, the removable circuit device 304 may process the command 602 according to the detailed information 606 provided in the message 600. Such a command 602 may cause the removable circuit device 304 to add new programming decryption keys and/or algorithms, remove or replace current decryption keys and/or algorithms, or perform any number of functions associated with the circuit device 304.

For those messages 600 addressed to the receiver 302 via the target address 604, the control circuitry 712 may decrypt any encrypted portions of the message 600, such as possibly the command identifier 602 and the detailed information 606, using the receiver decryption key 716 and associated decryption algorithm 718 described above. In one implementation, the decryption algorithm 718 may be firmware or software executed by the control circuitry 712, as opposed to a logic circuit or other hardware implementation of the algorithm 718.

After any necessary decryption of the command 600, the receiver 302 may then process the command 602, thus performing the function indicated therein. In addition to replacing, adding, or removing the decryption key 716 and algorithm 718 associated with the receiver 302, other functions described above, such as EPG updates, firmware updates, and the like, may be initiated by the command 602.

In one example, the command 602 provides an instruction for a user of the receiver 302 to replace the current removable circuit device 304 installed in the connector 704 with a newer smart card 304, as discussed above. In addition, the command 602 or the detailed information 606 may provide an identifier, such as the unique address 730 or serial number of the newer card 304 to be included in the instruction so that the user may determine which smart card 304 is expected to be installed in the connector 704. In the example of FIG. 7, the control circuitry 712 may forward the instruction to the output interface 710 for presentation to the user by way of text or other means displayed on the connected television 306.

In one implementation, other messages 600 carrying commands 602 that do not require processing by the smart card 304 may be addressed to the receiver 302. Such commands 602 may include, but are not limited to, cessation of the presentation of the instruction to replace the smart card 304, text messages indicating when a replacement smart card 304 has been shipped to the user, as well as other types of text messages to be presented to the user by way of the television 306. Other commands 602 may include auto-tuning the input interface 708 to a specific channel and placing the receiver 302 is a "standby" mode for synchronization and other maintenance purposes.

At least some embodiments as described herein thus allow communication from a media content source or provider to a media content receiver and a separately addressable removable circuit device installed in the receiver. By allowing both avenues of communication, the receiver may be able to continue to relay messages from the content source or provider to direct the user to replace an obsolete or defective removable circuit device with a proper replacement without this communication capability being provided by the removable circuit device. Further, the receiver may be able to function in the absence of the removable circuit device by continuing to receive and process commands and other messages required for continued operation by way of its own receiver identifier or address. For example, the receiver may be able to provide one or more free-of-charge media content channels or other services to the user without the use of decryption keys and/or related algorithms normally associated with an installed removable circuit device.

While several embodiments of the invention have been discussed herein, other implementations encompassed by the scope of the invention are possible. For example, while various embodiments have been described within the context of a television receiver or set-top box, other media content receivers, including, but not limited to, cable and terrestrial set-top boxes, televisions, audio receivers, and DVRs, may benefit from application of the concepts explicated above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of communication involving a media content receiver, the method comprising:
   at the media content receiver, receiving a message comprising an address wherein the address includes an indicator that is either a media content receiver address indicator or a removable circuit device address indicator;
   at the media content receiver, determining whether the indicator is the media content receiver address indicator or the removable circuit device address indicator;
   at the media content receiver, if the indicator is the media content receiver address indicator, processing the address to determine whether the address is associated with the media content receiver;
   at the media content receiver, if the indicator is the media content receiver address indicator, processing the address to determine whether the address is associated with a group of media content receivers that includes the media content receiver;
   if the address is associated with the media content receiver: at the media content receiver, processing the message;
   if the address is associated with the group of media content receivers that includes the media content receiver: at the media content receiver, processing the message;
   if a removable circuit device is installed in the media content receiver and if the indicator is the removable circuit device address indicator, then at the media content receiver, processing the address to determine whether the address is associated with the removable circuit device;
   if the removable circuit device is installed in the media content receiver and if the indicator is the removable circuit device address indicator, then at the media content receiver, processing the address to determine whether the address is associated with a group of removable circuit devices that includes the removable circuit device;
   if the address is associated with the removable circuit device, utilizing the media content receiver to transfer the message to the removable circuit device and processing the message utilizing the removable circuit device; and
   if the address is associated with the group of removable circuit devices that includes the removable circuit device, utilizing the media content receiver to transfer the message to the removable circuit device and processing the message utilizing the removable circuit device.

2. The method of claim 1, wherein:
   processing the message at the removable circuit device comprises decrypting the message by way of a first decryption key stored within the removable circuit device; and
   processing the message at the media content receiver comprises decrypting the message by way of a second decryption key stored within the media content receiver.

3. The method of claim 1, further comprising:
   exchanging communications between the media content receiver and the removable circuit device, wherein the communications are encrypted and decrypted using at least one of the first decryption key and the second decryption key.

4. The method of claim 1, further comprising:
   if the address is not associated with either the removable circuit device or the media content receiver, ignoring the message.

5. The method of claim 1, wherein:
   if the address is associated with the removable circuit device, the message comprises a command requiring processing by the removable circuit device; and
   if the address is associated with the media content receiver, the message comprises a command not requiring processing by the removable circuit device.

6. The method of claim 1, wherein:
   the address is associated with the media content receiver;
   the message comprises an instruction to the user to replace the removable circuit device in the media content receiver with a second removable circuit device; and
   the method further comprises presenting the instruction to the user by way of an output device coupled with the media content receiver.

7. The method of claim 6, wherein:
   the message comprises an address of the second removable circuit device; and
   the method further comprises presenting the address of the second removable circuit device to the user by way of the output device.

8. The method of claim 1, wherein:
   the address is associated with the media content receiver;
   the message comprises a third decryption key; and
   the message comprises a command for the media content receiver to replace the second decryption key with the third decryption key.

9. The method of claim 1, wherein:
   the address is associated with the media content receiver;
   the message comprises a decryption algorithm; and
   the message comprises a command for the media content receiver to employ the decryption algorithm for decrypting each message received at the media content receiver that includes an address associated with the media content receiver.

10. A media content receiver, comprising:
    a connector configured to receive a removable circuit device;
    an input interface configured to receive media content and messages;
    an output interface configured to transfer the received media content for presentation to a user; and
    control circuitry, wherein when the removable circuit device is installed in the connector and is associated with a first address, the media content receiver is associated with a second address, a group of removable circuit devices that includes the removable circuit device is associated with a third address, and a group of media content receivers that includes the media content receiver is associated with a fourth address and wherein the control circuitry is configured to: receive a message by way of the input interface, wherein the message comprises an address and the address includes an indicator that is either a media content receiver address indicator or a removable circuit device address indicator;

determine whether the indicator is the media content receiver address indicator or the removable circuit device address indicator;

if the indicator is the removable circuit device address indicator, process the address to determine whether the address comprises the first address or the third address;

if the indicator is the media content receiver address indicator, process the address to determine whether the address comprises the second address or the fourth address;

if the received address comprises the first address, direct the message to the connector for processing by the removable circuit device;

if the received address comprises the second address, process the message;

if the received address comprises the third address, direct the message to the connector for processing by the removable circuit device; and if the received address comprises the fourth address, process the message.

11. The media content receiver of claim 10, further comprising:

data storage configured to store a decryption key; wherein, to process the message, the control circuitry is configured to decrypt the message by way of the decryption key.

12. The media content receiver of claim 1, wherein:

the control circuitry is configured to exchange communications with the removable circuit device by way of the connector; and the communications are encrypted and decrypted using the decryption key.

13. The media content receiver of claim 10, wherein the control circuitry is configured to: when the removable circuit device is not installed in the connector, facilitate reception of a portion of the media content by way of the input interface, and facilitate transfer of the portion of the media content received for presentation to the user by way of the output interface.

14. The media content receiver of claim 10, wherein:

the message comprises the second address;

the message comprises an instruction to the user to replace the removable circuit installed in the connector with a second removable circuit device; and the control circuitry is configured to present the instruction to the user by way of the output interface.

15. The media content receiver of claim 14, wherein:

the message comprises an address of the second removable circuit device; and the control circuitry is configured to present the address of the second removable circuit device to the user by way of the output interface.

16. The media content receiver of claim 14, wherein: the input interface comprises at least one of a satellite television programming interface, a cable television programming interface, a terrestrial television programming interface, and a satellite radio programming interface.

* * * * *